United States Patent
Oberst et al.

[15] 3,640,836
[45] Feb. 8, 1972

[54] VIBRATION DAMPED SANDWICH SYSTEMS HAVING INTERLAYERS OF VINYL ACETATE-ETHYLENE COPOLYMERS

[72] Inventors: Hermann Oberst; Leonhard Reihs, both of Hofheim, Taunus; Joachim Ebigt, Mainz; Gunther Duve, Frankfurt, Main; Alfred Schommer, Bad Soden, Taunus, all of Germany

[73] Assignee: Farbwerke Hoechst Aktiengesellschaft vormals Meister Lucius & Bruning, Frankfurt, Main, Germany

[22] Filed: Oct. 19, 1970

[21] Appl. No.: 82,179

Related U.S. Application Data

[63] Continuation-in-part of Ser. No. 631,081, Apr. 14, 1967, abandoned.

[30] Foreign Application Priority Data

Apr. 23, 1966 Germany.............................F 49 028

[52] U.S. Cl..............................161/165, 161/218, 181/33, 260/86.7
[51] Int. Cl.....................B32b 7/02, B32b 15/08, E04b 1/99
[58] Field of Search.................260/86.7; 161/165, 166, 218; 181/33

[56] References Cited

UNITED STATES PATENTS 3,249,570   5/1966   Potts et al............................260/80.8
3,271,188   9/1966   Albert et al...........................161/218

Primary Examiner—William J. Van Balen
Attorney—Curtis, Morris & Safford

[57] ABSTRACT

Vibration damped sandwich systems having an improved damping effect within a broad range of temperature and consisting of hard plates and a vibration damping interlayer, said interlayer comprising a copolymer of ethylene, vinyl acetate and acrylic and/or methacrylic acid.

3 Claims, 5 Drawing Figures

VIBRATION DAMPED SANDWICH SYSTEMS HAVING INTERLAYERS OF VINYL ACETATE-ETHYLENE COPOLYMERS

This application is a continuation-in-part of Ser. No. 631,081, filed Apr. 14, 1967 and now abandoned.

The present invention provides vibration damped sandwich systems having interlayers made of vinyl acetate-ethylene copolymers.

It is known from South African Pat. No. 5,269 that highly valuable vibration damping materials of a broad temperature band suitable for damping bending vibrations of metal sheet constructions can be prepared by a copolymerization of monomers whose homopolymers differ in their second order transition temperature by at least 20° C. This patent also indicates that as vibration damping materials having a broad temperature band there are used, among others, predominantly amorphous copolymers of ethylene and vinyl esters of fatty acids containing two or three carbon atoms, for example vinyl acetate-ethylene copolymers. The vinyl acetate-ethylene copolymers hitherto used, however, have not been able to meet all technical requirements.

It has now been found that sandwich systems of hard plates, in particular metal sheets, having a considerably improved damping effect within a very large temperature range can be obtained by using as a vibration damping self-adhesive interlayer a copolymer of 20 to 40 percent by weight of ethylene, 80 to 60 percent by weight of vinyl acetate and 0 to 5 percent by weight of acrylic and/or methacrylic acid.

Example I which follows discloses a satisfactory method for preparing the desired copolymers. Other suitable processes can be employed.

EXAMPLE I

A mixture of 1,200 g. of tert. butanol and 50 g. of water was placed into a heatable, 5-liter, refined steel, high-pressure autoclave. The pH value of the mixture was adjusted to 4.0 with aqueous hydrochloric acid. Then, the mixture was heated to 65° C. and an ethylene pressure of 100 atm. was established. A solution of 7.0 g. of azodiisobutyronitrile in 800 g. of vinyl acetate was added over a period of 3 hours. The reaction temperature and the ethylene pressure were kept constant. Subsequently, the mixture was allowed to further react under the same conditions for 3 hours. The mixture was then cooled, relieved from pressure, and the copolymer was isolated from the reaction mixture by removing solvent and residual monomers under reduced pressure. The resulting copolymer contained about 40 percent of ethylene and had a molecular weight of about 900,000.

In accompanying drawing, FIGS. 1a-c are plots showing the loss modulus $d_{comb}$ as a function of temperature.

A comparison of FIGS. 1a to 1c illustrates the superior efficiency of the novel systems. The curve in FIG. 1b shows the loss factor $d_{comb}$ of a metal sheet arrangement of the invention as a function of temperature. It is, for example, compared with a usual copolymer of 28 percent by weight of vinyl acetate and 72 percent by weight of ethylene (curve in FIG. 1a) and with one of the most effective vibration damping materials known for metal sheet arrangements, namely a modified vinyl acetate copolymer containing plasticizers (curve in FIG. 1c). The copolymer shown in the curve of FIG. 1c is a thermoplastic adhesive especially suitable for preparing vibration damped metal sheet arrangements comprising two outer metal sheets and a self-adhesive thermoplastic as the vibration damping interlayer. Systems of this type provide a damping effect which is extremely high in its maximum and can not be exceeded for physical reasons (cf. H. Oberst and A. Schommer, Kunststoffe 55, 634 (1965), especially FIG. 9). In a symmetrical arrangement comprising two metal sheets, each of a thickness of 0.5 millimeter, and an interlayer of a thickness of 0.3 millimeter, the loss factor $d_{comb}$ of the combined system, measured in the bending resonance method (cf. for example H. Oberst, L. Bohn and F. Linhardt, Kunststoffe 51, 495 (1961)), almost reaches the value $d_{comb}$ of 1. The known metal sheet constructions damped by one-sided damping coatings which are applied as layers of so-called vibration damping material capable of being sprayed, trowelled or bonded, show loss factors generally less than $d_{comb}$=0.2, the combined system having a technically reasonable thickness of the coating or ratio of coating mass to plate mass. By means of the metal sheet sandwich systems which gain a growing importance in recent times, it is possible to obtain damping values increased by a multiple, when the interlayer material is chosen in the most appropriate composition and thickness, as is shown in the example cited herein.

The temperature bandwidth of the damping in the metal sheet sandwich system does not only depend on the viscoelastic values of the interlayer and of the steel sheets, but, to a considerable extent, also on the "geometry" of the arrangement, i.e., on the ratio of the layer thicknesses (see cited literature (1965) FIGS. 8 to 10). In the case of metal sheet sandwich systems, it is advantageous to define the bandwidth to be the range of the temperature interval within which the value $d_{comb}$=0.05 is exceeded. The damping effect of metal sheets which are not damped by additional vibration damping means in metal sheet constructions of a different kind, corresponds to values $d_{comb}$=0.01 and less. The reference value $d_{comb}$=0.05 thus means a considerable increase in the damping effect (by about 15 db. (decibel)) as compared to the "nil damping" $d_{comb}$=0.01.

In the curve shown in FIG. 1c, the reference value $d_{comb}$=0.05 is exceeded in the mainly interesting frequency range of from 100 to 1,000 c.p.s. (Hz.) at temperatures ranging from about 0° to 50° C., the temperature bandwidth therefore amounts to about 50° C. It is for this reason that sandwich systems of this type are suitable for many technical fields of application. By modifying the content of plasticizers, it is possible to shift the temperature band of a high damping effect to higher temperatures and thus to adapt it to special technical uses, for example in machine units operating at elevated temperatures. This construction mode of metal sheet sandwich systems comprising a self-adhesive interlayer of the most appropriate composition and thickness, of a vibration damping material having a broad temperature band and being prepared by copolymerization of appropriate monomeric components, has hitherto not been excelled by other arrangements of a similar kind and can therefore be regarded as a standard system which can serve for judging the acoustic efficiency of the system of the invention by comparison.

FIGS. 1a–c show the temperature curves of the loss factor $d_{comb}$ of metal sheet sandwich systems comprising steel sheets of a thickness of 0.5 millimeter each and damping interlayers of a thickness of 0.3 millimeter within a frequency range of from 100 to 1,000 c.p.s. The curves have been measured in sandwich systems comprising 1a. a usual copolymer of 28 percent by weight of vinyl acetate and 72 percent by weight of ethylene as an interlayer, 1b. a copolymer of 72 percent by weight of vinyl acetate and 28 percent by weight of ethylene as an interlayer (according to the present invention) and 1c. a modified vinyl acetate copolymer containing plasticizers, as an interlayer.

The curves in FIG. 1a are valid for a monomer proportion beyond the range of the proportions by weight given as an optimum. They show a remarkable bandwidth as can be expected for such a copolymer; but the $d_{comb}$-values of the peaks are not higher than those of metal sheets having one-sided coatings of the most appropriate composition and thickness, and are so far below the standard arrangement 1c that the interlayer material of the arrangement 1a is of no technical interest.

In contradistinction thereto, the arrangement 1b of the invention whose monomer proportion lies in the optimal range, shows a surprisingly large temperature band and relatively high maximum values of damping. The reduced peaks of the curves in FIG. 1b, compared with those of the curves in FIG. 1c may be accepted with regard to the considerable bandwidth. Even the sagging of the curve in FIG. 1b at 100 c.p.s. has no detrimental consequence; for, within the whole temperature range between −10° and 100° C., the values $d_{comb}$=0.1 are exceeded, i.e., the damping effect exceeds the nil damping ($d_{comb}$=0.01) by more than 20 db. within the whole range. Such a damping effect is completely sufficient for most of the technical uses. Even at 1,000 c.p.s. the bandwidth is still 90° C. (−10° to 80° C.) with reference to $d_{comb}$=0.05. This material having a broad temperature band may therefore be used generally for any range of temperature between −10° and about 100° C., for example in vehicles as well as in machine units operating at elevated temperatures.

A particular advantage of this vibration damping material resides in the fact that it is perfectly suitable for being applied continuously in the mass production of sandwich metal sheets. It also is a thermoplastic adhesive which can be applied to the metal sheets by trowelling, brushing or pouring at elevated temperatures. The sandwich system is then advantageously cooled under pressure between rolls. Except a degreasing the metal sheets do neither require a preliminary treatment nor another bond. Copolymers containing acrylic and/or methacrylic acid groups may even do without degreasing. An excellent adhesion is achieved.

The vibration damping material has a good resistance to flow even at elevated temperatures, a resistance which may still be improved in the copolymers containing carboxyl groups, by a slight cross-linking, for example with epoxides or isocyanates. The sandwich metal sheets can be processed in a manner corresponding, within wide limits, to that of usual metal sheets, i.e., they may be creased, bent, shaped, welded and riveted. Unless their curvature radii are too narrow, they may even be formed with plug and ring. There are obtained generally usable sandwich metal sheets having such a damping effect and such a temperature range of damping as are well sufficient for most of the application fields.

Small amounts of fillers, for example for improving the electric conductivity (improvement of the resistance welding) may be added to the vibration damping material. For not adversely affecting the damping effect, it is advantageous to add less than 1 percent by weight, preferably less than 0.5 percent by weight referred to the polymer, of the filler amount. Appropriate fillers are, for example, heavy spar, silicic acid, graphite and soot.

The total thickness of the sandwich system of the invention preferably ranges between 1 and 6 millimeters. The interlayers may be in the range of from 0.1 to 1 millimeter, preferably from 0.2 to 0.5 millimeter. The maximum damping effect is obtained in symmetrical sandwich systems. The stiffness in flexure and the stability, however, are higher in asymmetric sandwich arrangements having the same weight. These asymmetric sandwich systems are therefore preferred for uses which require the highest possible stability, referred to the weight. The ratio between the thicknesses of, for example metal sheets, preferably ranges between 1:1 and 1:4.

Figure 1A:
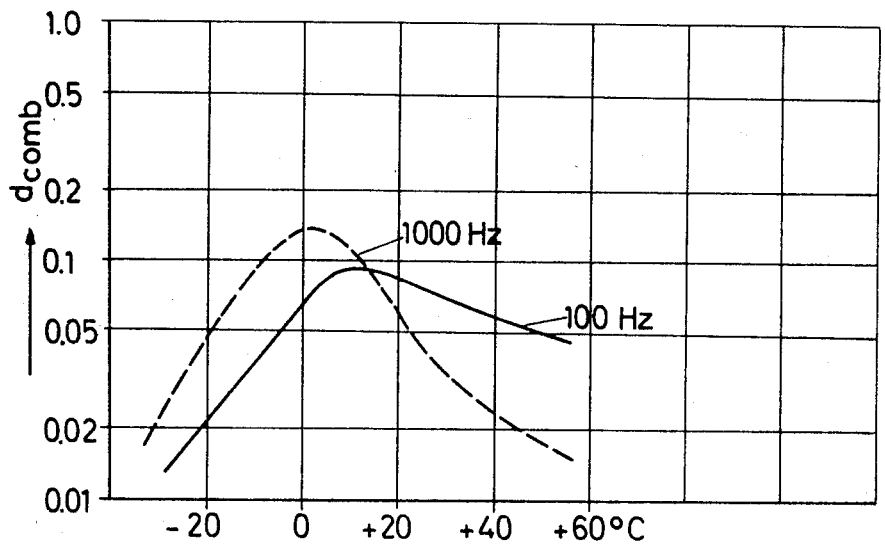
Figure 1B:
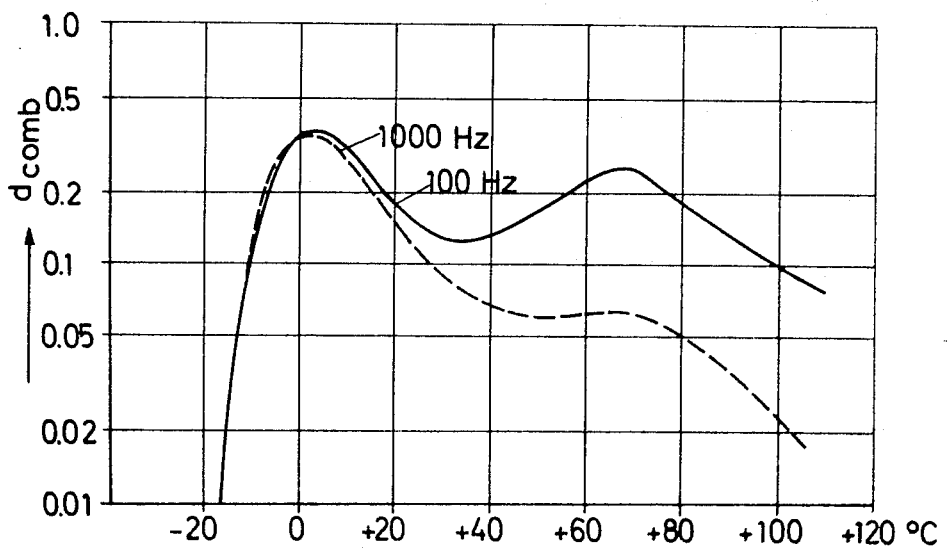
Figure 1C:
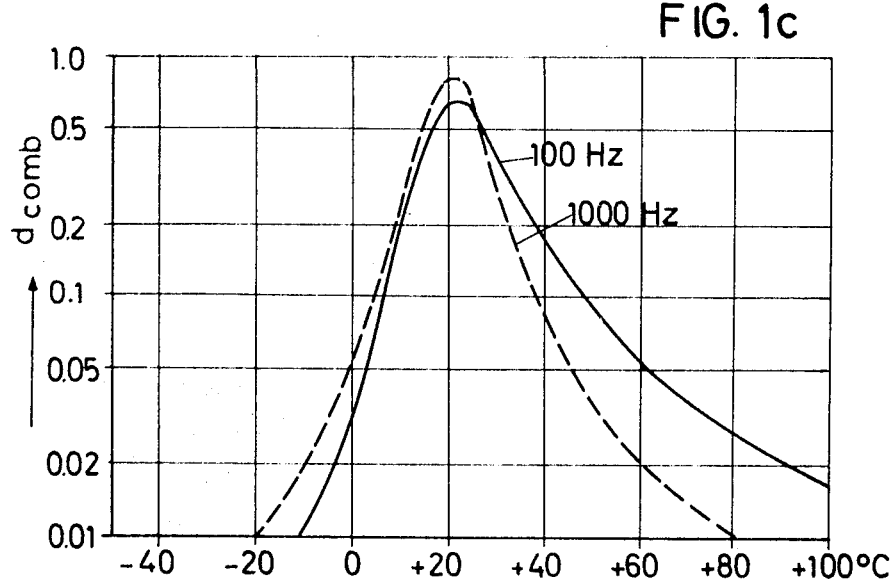
Figure 2A:
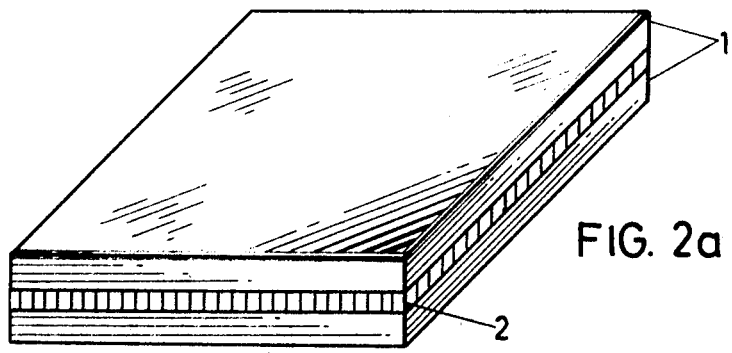
FIG. 2a shows a sandwich system of the invention in a symmetrical arrangement.
Figure 2B:
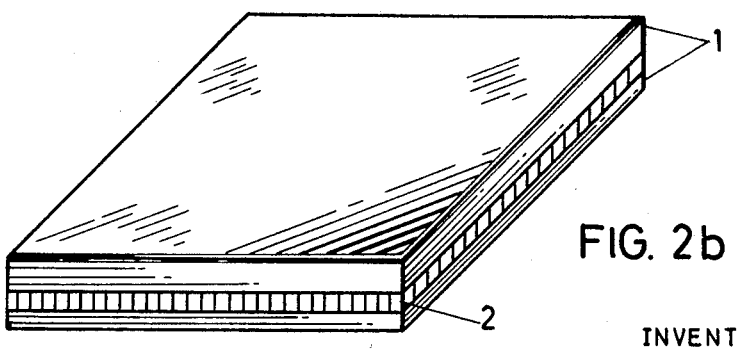
FIG. 2b shows a sandwich system in an asymmetric arrangement. The two outer plates or sheets 1 have the vibration damping layer 2 therebetween.

What is claimed is:

1. In a vibration damped sandwich system including hard plates and a vibration damping interlayer, said interlayer having improved damping effect within a broad temperature range, comprising: a copolymer of 20 to 40 percent by weight ethylene and 80 to 60 percent by weight vinyl acetate.

2. An improved vibration damping interlayer as recited in claim 1, wherein the copolymer contains up to 1 percent by weight, calculated on the copolymer, of a filler selected from the group consisting of heavy spar, silicic acid, graphite and soot.

3. A vibration damped sandwich system as recited in claim 1 comprising outer plates having a thickness ratio to one another of from 1:1 to 1:4.

* * * * *